UNITED STATES PATENT OFFICE 2,691,037

MANUFACTURE OF ALPHA-BETA UNSATU-
RATED ALIPHATIC NITRILES

Frederick James Bellringer, Wimbledon, London,
Thomas Bewley, Epsom, and Herbert Muggle-
ton Stanley, Tadworth, England, assignors to
The Distillers Company Limited, Edinburgh,
Scotland, a British company No Drawing. Application May 27, 1954,
Serial No. 432,629

Claims priority, application Great Britain
December 30, 1950

21 Claims. (Cl. 260—465.9)

The present invention refers to the manufacture of organic nitrogen-containing compounds and in particular to the manufacture of alpha,-beta-unsaturated aliphatic nitriles by reaction of alpha,beta-unsaturated aliphatic aldehydes with ammonia. This application is a continuation-in-part of copending application Serial No. 262,646 filed December 20, 1951.

It has already been stated that if a mixture of acrolein and ammonia is catalytically reacted in the gas phase, beta-picoline is obtained together with resins. It has also been stated that unsaturated aliphatic nitriles may be produced in good yields by passing a mixture of the corresponding saturated or unsaturated aliphatic aldehyde and ammonia over a dehydrating dehydrogenating catalyst under conditions such that the principal product of the reaction is an unsaturated nitrile. Under the conditions described, however, we have been unable to obtain any appreciable acrylonitrile from the corresponding unsaturated aldehyde-acrolein.

The principal object of the invention, accordingly, is to provide a simple, efficient process of the kind described for producing nitriles.

The invention accordingly comprises the novel processes and steps of processes, specific embodiments of which are described hereinafter by way of example and in accordance with which I now prefer to practice the invention.

We have found in accordance with our invention that when alpha,beta-unsaturated aliphatic aldehydes are catalytically reacted with ammonia and molecular oxygen at elevated temperatures in the vapor phase unsaturated nitriles are produced in satisfactory yields and with high efficiency.

Accordingly, the process for the production of unsaturated nitriles comprises reacting alpha,-beta-unsaturated aliphatic aldehydes or compounds yielding such aldehydes under the reaction conditions at elevated temperatures in the presence of a catalyst with ammonia and molecular oxygen.

Suitable alpha,beta-unsaturated aldehydes which may be used for the process according to the present invention are, for instance acrolein, alpha-methacrolein, crotonaldehyde and alpha-ethyl-beta-propyl acrolein. Compounds which under the conditions of the reaction, for instance by oxidation or by dehydration and/or de-alcoholization give rise to such unsaturated aldehydes and which may be used for the process of the invention are, for instance allyl alcohol, alpha-methyl allyl alcohol, beta-alkoxy propionaldehyde, diallyl ether, acrolein acetal, trialkoxy propane and beta-alkoxy isobutyraldehyde. If desired, mixtures of an aldehyde and the corresponding alcohol may be used.

A great variety of catalysts may be used for carrying out the process of the invention. Useful catalysts may contain metal or metal oxides or compounds of, for instance, the following metals: copper, chromium, vanadium, manganese, iron, cobalt, nickel, molybdenum, silver, zinc, cadmium, tin, tungsten, rhenium, lead, platinum, gold, aluminium, palladium, rhodium, bismuth, uranium, and these metals or metal compounds may be used singly or in a mixture of two or more. Preferably catalysts may be used which are known to be suitable for the vapour phase partial oxidation of organic compounds, for example, the oxidation of benzene or naphthalene to maleic and phthalic acids respectively. Catalysts containing molybdenum or its compounds are particularly suitable. Instead of a single catalyst, two or more catalyst beds of different activity, and, if necessary, at different temperatures may be used, employing, for example a catalyst of moderate activity for the first part of the reaction, and a highly active catalyst for that part where the concentration of the aldehyde is low enough to prevent too violent reaction.

The catalysts aforementioned may be used alone, or mixed with or supported on suitable materials. Such materials are for instance silica in its various modifications including silica gel, silicates, for example fuller's earth, pumice, kieselguhr, clays, mica, zeolites, porcelain and other refractory material, alumina, bauxite, thoria, beryllia, magnesia, magnesite, cerium oxide, titanium oxide, silicon carbide, zirconia, asbestos and graphite.

The catalysts may also be supported on metals in the form of gauze, turnings, ring chips, granules, tubes.

It has further been found that especially in the production of polymerisable nitriles such as acrylonitrile, the efficiency and rate of the reaction are considerably dependent on the pretreatment of the catalyst or its support. Thus, for instance, in the case of an alumina-supported catalyst, the catalyst is improved by heating the carrier at, say, 1,000° C., before or after addition of the catalytic agent. The catalyst may also be activated by pretreatment with ammonia and/or oxygen.

It has also been found that particularly active catalysts are those comprising molybdenum or a molybdenum compound supported on alumina which has been heated to an elevated temperature before deposition of the molybdenum or molybdenum compound, where the catalyst contains combined sodium or potassium in a proportion amounting from about 0.1% to not more than about 10% of combined sodium or from 0.1% to not more than about 20% of the potassium based on the weight of the alumina. In the preparation of such a catalyst the alumina is heated in air to a temperature of between 800° and 1200° C. and preferably between 900° and 1100° C. for a period of at least about half-an-hour. If the alumina used contains combined sodium or potassium in the range above stated no further treatment is then required other than the deposition of the molybdenum or molybdenum compound on the alumina. Commercial alumina usually contains from less than 0.1% up to about 0.6% of combined sodium and is useful per se as a carrier, particularly of molybdenum oxide. If, however, the process of the manufacture of alumina has resulted in a product containing less than the desired range of sodium or potassium, the catalyst is treated by addition of a sodium or potassium compound to introduce same into the alumina, in addition to the heat treatment of the alumina, before use in the process of the present invention. The treatment of the alumina with the sodium or potassium compound may be carried out at any stage in the preparation of the catalyst. Suitable compounds of sodium and potassium which may be used include the hydroxides, chlorides, sulphates, carbonates, aluminates, nitrates, phosphates, and molybdates. Other compounds such as organic compounds of sodium and potassium may also be used. As stated, the proportions of the sodium incorporated with the alumina may vary from about 0.1% up to 10% by weight of combined sodium based on the weight of the alumina. It is preferred to use amounts in the range of about ½ to 5% and for optimum results about 1%. In the case of potassium from about 0.1% up to 20% of combined potassium may be incorporated with the alumina but it is preferred to use amounts in the range of about 2.5 to 10%. The optimum concentration for potassium is about 7%. If higher proportions of sodium or potassium than those specified are incorporated the yield of unsaturated nitriles deteriorates.

A catalyst on a silica base may be prepared for instance, by impregnating silica gel with a suitable solution or dispersion of the effective metal compound or compounds, or by co-precipitation of the said metal compounds with silica. As regards supported or diluted catalysts, those containing silica or silicates offer several advantages, especially for the conversion of acrolein. For example we have found that while, as already stated, molybdenum oxide gives very good yields of acrylonitrile similar yields may be obtained using the much less expensive mixture consisting of 70% $MoO_3$ and 30% silica gel. As the proportion of silica gel to molybdenum oxide was increased the yield of nitriles produced was found to be reduced using equal volumes of the catalysts and the same reaction conditions. Thus, for instance, a composition containing 20% $MoO_3$ and 80% silica gel produced considerably inferior results to those obtained using a 70:30 mixture. By the addition of phosphoric acid to such compositions containing 20% $MoO_3$ and 80% silica gel, however, it is possible to obtain an activity of the catalyst equal to that of molybdenum oxide alone. The optimum range of phosphoric acid to molybdenum oxide is one mole of phosphoric acid to about 3–12 moles of molybdenum oxide. The improvement resulting from the addition of phosphoric acid to a composition comprising only a comparatively small amount of molybdenum oxide is the more surprising since a mixture containing a high proportion of molybdenum oxide such as 70% to 30% silica gel is not substantially improved by the addition of phosphoric acid. It is therefore possible to obtain good results in the manufacture of unsaturated nitriles using as catalyst a composition containing only a small proportion of the relatively expensive molybdenum oxide. A particularly suitable composition contains about 80 parts by weight of silica gel to about 20 parts by weight of molybdenum oxide and, in addition, one mole of phosphoric acid to each 12 moles of $MoO_3$.

It will be seen from the above that phosphoric acid promotes the efficiency of the molybdenum oxide silica gel catalyst and it may also be used in a similar way with others of the catalysts and carriers named above.

A further highly active catalyst is molybdenum oxide on kieselguhr. Thus, for example, kieselguhr pellets impregnated or mixed with an amount of the order of 28% of molybdenum oxide can yield nearly 80% of acrylonitrile.

For the process according to the invention the known method of vapour phase catalysis may be applied. The catalyst may be a stationary or moving bed, or may be introduced into the reaction zone as volatile compounds. In view of the high heat output and the necessity of keeping good control of the temperature, a fluidized bed method may be of special advantage.

Alternatively, the control of temperature in the catalyst bed can be facilitated by the use of less active catalysts, which reduces high temperature peaks. Such a catalyst is, for instance, pumice impregnated with small amounts of molybdenum oxide. Over a catalyst of this type less heat is produced per unit volume of catalyst. In such a case it may be advisable to pass the gas mixture subsequently over a more active catalyst, in order to complete the reaction in a convenient contact time.

It has been found that the inclusion of oxygen with the reactants leads to the production of improved yields of nitriles under the reaction conditions specified. If, however, the process is conducted without molecular oxygen being present, the yields of nitriles are insignificant. The use of oxygen does not lead to early deterioration of the catalyst under the reaction conditions.

Its concentration in the reaction mixture may vary within wide limits. Generally, it is preferred to feed to the reactor a gas mixture containing more than three and less than twenty per cent of oxygen, and at least one half of a molecule of oxygen per mole of the organic compound to be reacted. When using alcohols as the starting material, the amount of oxygen used may exceed that used in the case of aldehydes.

The ratio of ammonia to the organic compound in the reaction mixture may also vary; a ratio of more than one mole of ammonia to one mole of the organic starting material may be used with advantage, for instance between 1.1 to 1 and 1.5 to 1 in the case of acrolein. In the case of allyl alcohol, the ratio may vary between 1.1 to 1 and 3.0 to 1. Higher proportions of ammonia may be used if desired. The reaction mixture issuing from the reactor may contain besides the desired nitrile and unconverted organic starting material some unreacted ammonia which when the nitrile is absorbed in water for its recovery, is preferably neutralized by the addition to the dissolving water of acid, for example sulphuric acid. Alternatively, the amount of ammonia in the feed gas to the reactor may be restricted to such an extent that the gases leaving the reactor no longer produce a marked alkaline reaction with water with which they are contacted. By restricting in this manner the amount of ammonia, the efficiency of the reaction and the production of nitrile, especially acrylonitrile, is not seriously affected as long as the amount of ammonia is not reduced substantially below that amount which just causes an alkaline reaction in the water with which the gases leaving the reactor are contacted. This limit can be readily ascertained by a few preliminary tests and it will be generally found that the lower limit of the molar ratio of ammonia to aldehyde or alcohol is about 1 to 1.

The concentration of the organic compound in the mixture of the reactants is preferably kept low. A useful concentration is below 10%, preferably below 3%, but gas mixtures containing higher concentrations, for example, more than 50% of acrolein may also be used under suitably regulated conditions, for example when the reaction is controlled by limiting the amount of oxygen and/or ammonia.

As diluents there may be used gases or vapours which are substantially inert under the conditions of the reaction, for example nitrogen, carbon dioxide and steam. A preferred method of carrying out the reaction is to pass over the catalyst a mixture of the unsaturated aldehyde and ammonia with air. When using steam as diluent, the gases leaving the reactor may be passed directly into a still, at the top of which the nitrile is collected. It is advisable to use large proportions of diluent, for example more than 70% by volume of the mixture as this contributes to the catalyst life. Diluents also serve to enable the reaction to be carried out outside the explosive range.

The ammonia may be mixed with the other reactants either immediately before contact with the catalyst or at any time prior to such contact.

We generally prefer to add the ammonia to the gas stream containing the aldehyde before preheating to the reaction temperature, as in this way formation of carbon dioxide is minimized. The gas stream is preferably heated to about 120° C. before adding the ammonia, to avoid condensation of the aldehyde and ammonia to high-boiling products. The ammonia is then added and the mixture so formed may then be heated to the approximate reaction temperature in a preheater, again with the object of avoiding loss of acrolein by combustion. We also prefer to avoid subjecting gases containing a high concentration of aldehyde to elevated temperatures, particularly in the presence of oxygen. Thus we generally evaporate the aldehyde at low temperatures and mix with a diluent before the usual preheating step. Ammonia may be added as such or admixed with steam or other diluents.

Suitable temperatures for the reaction vary within fairly wide limits. Temperatures between 250 and 600° C. have been found to be suitable. The most convenient temperature depends to a certain extent on the various conditions prevailing during the process. Generally, it is preferred to operate between 350 and 500° C. It is, however, possible to exceed this limit if at the same time a suitably short contact time and/or a less active catalyst is employed. The temperature, furthermore, depends to a certain degree on the concentration of the organic compound used and of the molecular oxygen in the reaction mixture, and can be modified by adding to said mixture as diluent inert gases, such as nitrogen, carbon dioxide or steam. Temperatures higher than 600° C. at which combustion of the organic starting material becomes excessive should preferably be avoided. A positive temperature gradient over the catalyst bed in the direction of the flow of the gas current may be used, so that the gases enter the reaction zone at a lower temperature, and owing to the heat of reaction are heated up to the suitable optimum temperature. Both the lowest temperature at which the reaction of the organic compounds serving as starting material with ammonia in the presence of oxygen is initiated and the highest temperature which will still give economic yields of the unsaturated nitrile can be determined by simple experiment with the chosen catalyst.

As in many other similar reactions, the optimum contact time for the gas mixture with the catalyst depends mainly on the nature of the catalyst and on the other conditions prevailing in the reactor. It has been found that contact times for the gaseous mixture with the catalyst of the order of 0.1 to 20 seconds, preferably less than 10 seconds, are used with advantage. This contact time is calculated by relating the volume of the gas mixture fed per second at ordinary temperature and pressure to the volume taken up by the catalyst in the reactor. Since the unsaturated nitriles, particularly acrylonitrile, are quite stable under the preferred conditions, a contact time is selected which is long enough to convert most or practically all of the starting material so that the recovery of any unreacted materials from the reaction gases is simplified, and costly working up operations avoided.

Since the unsaturated nitrile produced during the catalytic reaction and any unreacted aldehyde tend to react and form polymerisation or condensation products under the influence of an excess of ammonia it is preferred to operate so that the gases leaving the reactor contain substantially no excess of ammonia as previously generally discussed.

The reaction may be carried out substantially isothermally or substantially adiabatically, or in such a manner that a part of the heat of the reaction is taken up by suitable temperature increase of the reaction gases. The reaction may also be conducted in stages with inter-stage cooling of the gases to the lower temperature limit.

The reaction may also be carried out by injecting the aldehyde and/or ammonia in small quantities at various points in the catalyst bed.

The process may conveniently be carried out in a recycle system. In view of the high stability of the nitrile especially acrylonitrile under the reaction conditions, part of the gas mixture leaving the reactor may be recycled without the nitrile being removed therefrom, whilst the remainder goes to the recovery system. Part of the gas returning to the reactor may, of course, also be freed from the nitrile or the whole recycle gas may be partially scrubbed from the nitrile. Part of the gas mixture leaving the reactor may also be recycled after having passed through the recovery system for the nitrile, the whole or only part of the nitrile having been scrubbed out. The remainder of the nitrile is then recovered from the vent gases. By this means economies in the recovery system can be made, the concentration of oxygen can be varied advantageously, and the efficiency of the reaction increased.

Though the process is carried out generally at atmospheric pressure, superatmospheric or subatmospheric pressures may be used in the reactor and/or in the absorption system.

Any ammonia or other basic constituent present in the gases leaving the reactor is preferably neutralized before or simultaneously with cooling of the gases, in order to avoid losses of the nitrile and/or aldehyde. Suitable measures to effect this neutralization are, for example quenching the gases with acid for instance in aqueous solution or by the addition of acid vapours or acid spray to the gas. In order to recover heat, partial indirect cooling may be applied, but it is desirable that the gases are not cooled down before neutralization to such a low temperature that deposition of condensation products occurs, particularly if a considerable proportion of unchanged aldehyde is present in the gases. Generally this lower temperature limit is about 120° C. Thus, for example the gases issuing from the reactor are passed through a scrubbing system in which they are contacted with water the pH value of which is maintained below 7 by the addition of acid, whereby ammonia and amines are converted into their respective salts, and the gases cooled down. Although it is known that nitriles are hydrolyzed in aqueous acid medium, it has been found that in this way the ammonia and other alkaline substances can be effectively absorbed from the dilute gaseous mixture without undue loss of nitrile. When a tower or similar appliance is used for the scrubbing out of the ammonia and other alkaline substances, it is preferred to circulate the acidified scrubbing water, whereby after the water has become saturated with the nitrile, no further amount of nitrile is removed from the gaseous mixture, whilst the acid water continues to remove further quantities of ammonia and other alkaline substances. It is advisable to add fresh acid to the system and withdraw part of the circulating absorption liquor containing as much of the formed salt as possible. For economic reasons, it may be desirable to maintain the ammonia absorber at as high a temperature as possible. A second scrubber then extracts the main bulk of the nitrile produced.

It is also possible to pass the gas mixture from the reactor directly into a single scrubber system, where the nitrile as well as any unchanged aldehyde and also the basic compounds, for example ammonia, are absorbed in water, the pH value of which is kept neutral or slightly acid.

The methods of recovery of the produced nitrile from the reaction products depends on the volatility and solubility of the nitrile. In the case of lower nitriles, it is preferred to scrub the reaction gases with a suitable solvent for the nitrile, for example, water, alcohol, glycols and high boiling hydrocarbons, preferably after the reaction mixture leaving the reaction zone has been quenched and the ammonia neutralized. Water is preferably used, for the recovery of the lower nitriles such as acrylonitrile, preferably in countercurrent. The nitrile may then be obtained from its solution in the said solvent by for example fractional distillation.

The following examples serve to illustrate the way in which the process of the invention may be carried out in practice:

Example 1

A solution of 30 grams of ammonium molybdate in 100 cc. of water was mixed with a solution of 35.7 grams of ferric nitrate in 100 cc. of water. 300 cc. of activated alumina which had passed an 8-mesh sieve (British Standard Testing Sieve) and was retained by a 16-mesh sieve was steeped in this mixture and the whole was evaporated to dryness. The product was heated at 450° C. in an air stream for 12 hours before use.

150 cc. of this ferric molybdate containing catalyst was placed in a reactor tube.

Per hour 0.8 mole of acrolein, 1.42 moles of ammonia and 2.44 moles of air were separately preheated at 280° C. and mixed with 3.6 moles of steam and 0.7 mole of nitrogen which were also preheated at 280° C. and this mixture was passed over the catalyst at 285° C. at atmospheric pressure. The molar concentration of acrolein based on the total reactor feed was 8.86%. The contact time of the reactants with the catalyst was 2.5 seconds.

The furnace effluents were passed directly into a cooled aqueous solution containing 15% by weight of sulphuric acid, the pH value of the said solution being maintained at 3. The resulting acid liquors were extracted with ether and the ether extract dried. The dry ether extract contained acrylonitrile in an amount representing a conversion of 11.7% on the acrolein fed. The ether solution was distilled and after removal of the ether, the main fraction boiled at 76.5 to 77° C. and had a refractive index $n_D^{20}=1.3903$ and accordingly was acrylonitrile.

The above process was repeated under similar reaction conditions except that the air feed was replaced by a nitrogen feed without oxygen. The product was worked up in the same way but was found to contain no acrylonitrile.

Example 2

Per hour 1.4 moles of air were charged with 0.19 mole of acrolein vapours. This mixture was preheated in a coil to 225° C. and then mixed with a similarly preheated mixture of 0.47 mole of ammonia and 8.1 moles of water. The reactants were introduced into a reactor which was charged with 200 cc. of a catalyst which was maintained at about 440° C. The contact time was 3 seconds. The catalyst was prepared as follows:

690 grams of silica gel which passed an 8-mesh sieve and was retained by a 10-mesh sieve (British Standard Testing Sieve) were immersed in a solution of 60 grams of ammonium molybdate dissolved in 350 cc. water. The water was evaporated and the residue impregnated with a solution of 71.4 grams of ferric nitrate dissolved in 350 cc. of water. This mixture was then taken slowly to dryness with continuous agitation and sieved to retain the mesh size above mentioned for charging the reactor. The catalyst, therefore, consisted of ferric molybdate supported on silica gel.

The effluent gases were quenched in a column in which brine-cooled water was circulated, the pH value of the circulating solution being maintained at or about 7 by the addition of sulphuric acid. The acrylonitrile and unchanged acrolein were extracted from the resulting aqueous solution by means of ether and the acrylonitrile isolated therefrom by fractional distillation of the dry extract. The yield of acrylonitrile was 33.8% based on the amount of acrolein fed into the catalyst reactor. 22.8% of the acrolein charged was recovered unchanged.

Example 3

A catalyst was prepared in a similar way to that described in Example 2 and was heated after drying in a stream of air at 450–500 C. overnight.

8 grams of this catalyst was placed in a U-shaped reactor of 6 mm. bore tube of "Pyrex" glass in which it was heated in a thermo-controlled bath of molten tin at 450° C.

The feed to the reactor consisted of the following mixture which was maintained at about 450° C.

19.5 l./hr. of nitrogen  
3.75 l./hr. of air  } Measured at room temperature and pressure  
1.20 l./hr. of ammonia  
1.2 gm./hr. acrolein vapour = 0.48 litres The contact time of gas and catalyst was 1.2 seconds.

The gas mixture leaving the reactor was quenched in dilute sulphuric acid and then scrubbed by a countercurrent stream of water. The aqueous solution of acrylonitrile thus obtained was fractionally distilled and it was found that 44% of the acrolein fed was converted to acrylonitrile, and 13% was recovered unchanged.

When the air in the feed was replaced by nitrogen so that no oxygen was present therein, 30% of the acrolein fed was recovered but no acrylonitrile was detected in the reaction product.

Example 4

2.5 litres per hour of nitrogen, measured at room temperature and atmospheric pressure was passed through an acrolein reservoir at 12° C., whereby 1.3 grams of acrolein was evaporated per hour. The mixed gases leaving the reservoir were joined by a stream of air of 22 litres per hour and the combined stream passed to the top of one limb of a U-shaped ¼ inch bore reactor tube of "Pyrex" glass, which was heated in a liquid bath at 400° C. One limb of the U tube served as a preheater. Ammonia gas was fed at the rate of 0.6 litre per hour through another tube inside, and concentric with, the said limb of the U tube reactor, arranged so that the ammonia mixed with the other gases at a point about 6 inches below the surface of the said liquid salt bath. The molar proportions of acrolein to oxygen and to ammonia were thus: about 1 of acrolein to 8.75 of oxygen to 1.2 of ammonia.

In the other limb of the said U reactor 8 grams of a catalyst prepared as described below was placed and the mixture of gases passed through the tube. The contact time of the gas mixture with the catalyst was therefore 1.2 seconds. The temperature of the catalyst in consequence of the small diameter of ¼ inch of the catalyst layer was the same as the surrounding salt bath, namely 400° C.

134 grams of commercial sodium metasilicate was dissolved in 1,340 cc. water and sufficient dilute hydrochloric acid (1 vol. concentrated HCl to 3 vol. water) added to render the solution acid to methyl red. The resulting gelatinous precipitate was filtered off and washed with water. To the washed hydrated gel was added 3 cc. 2 molar phosphoric acid and a solution of 12.5 grams ammonium molybdate in 60 cc. water. The mixture was evaporated to dryness at 100–120° C. with frequent stirring and then formed into pellets ⅛ of an inch in diameter and ⅛ of an inch long. The resulting product consisted of phosphomolybdic acid on silica gel.

The reaction product was worked up as in the preceding examples. 82% of the acrolein fed was converted to acrylonitrile and 3% was recovered unchanged.

Example 5

Ammonium molybdate was pelleted to a size of 3/16 inch and activated by heating at 400° C. in an air stream for 5 hours to remove ammonia and water.

224 grams of this catalyst taking up a volume of 150 cc. were placed in a 1 inch bore mild steel reactor which was heated by a thermostatically controlled bath of liquid salt.

Per hour a mixture of 174.4 litres of air, 16.7 litres of nitrogen and 4.18 litres of vaporized acrolein, all measured at atmospheric pressure and temperature was preheated at 120° C. and mixed with 4.5 litres ammonia. The mixture was preheated at 365° C. and then passed over the catalyst. The catalyst bed temperature ranged from 365–405° C. The contact time was 2.7 seconds. The reaction product was worked up as in the preceding examples.

81.5% of the acrolein fed was converted to acrylonitrile and 4.1% was recovered unchanged.

Example 6

A catalyst was prepared by impregnating kieselguhr pellets with saturated ammonium molybdate solution. After heating at 350° C. in an air stream for 12 hours the catalyst contained 28% of molybdenum oxide. 245 grams (equal to 300 cc.) of this catalyst were charged into a reactor as described in Example 5. Per hour a mixture of 210 litres of air, 5.3 litres of nitrogen and 2.46 grams (equal to 1.06 litres) acrolein vapour, all measured at atmospheric pressure and temperature was preheated at the bath temperature of 334–359° C. and mixed with 1.3 litres of ammonia. This mixture was passed through the reactor whilst the catalyst bed was maintained at a temperature of 334–359° C. The contact time was 1.2 seconds. The reaction product was worked up as in the preceding examples. 77.2% of the acrolein fed was converted to acrylonitrile. No acrolein was recovered unchanged.

Example 7

25 grams of activated alumina which had been passed through an 8-mesh sieve (British Standard Testing Sieve) but was retained on a 16-mesh sieve was heated for 3 hours at 1,000° C. and after cooling was immersed in a solution of 50 grams of ammonium molybdate in 50 cc. of water to which was added 12 cc. of 2-molar phosphoric acid. The mixture was evaporated to dryness with frequent stirring. 8 grams of the catalyst so prepared was placed in a U-shaped "Pyrex" glass tube reactor of ¼ inch diameter which was heated by a liquid salt bath to 400° C. Through this reactor were passed a mixture of 4% by volume of acrolein, 4% by volume of ammonia and 92% by volume of air, preheated to the bath temperature of 400° C. at a rate of 25 litres per hour giving a contact time of 1.2 seconds. The issuing gas was passed through dilute sulphuric acid, then scrubbed by a countercurrent stream of water which absorbed the acrylonitrile.

The acrolein was converted to acrylonitrile in a yield of 44%.

Example 8

A copper oxide oxidation catalyst was prepared by dissolving 8 parts by weight of commercial sodium metasilicate in 80 parts of cold water. To the stirred solution was added dilute hydrochloric acid (made by diluting one volume of concentrated hydrochloric acid with four volumes of water) until the mixture was acid to methyl red. In another vessel one part by weight of sodium metasilicate was dissolved in 40 parts of water and to this was added a solution of one part copper nitrate—$Cu(NO_3)_2 3H_2O$—in 10 parts of water. The second mixture was poured into the first and the whole vigrously stirred. The mixed precipitate was filtered off under suction and the filter cake, after being dried at 80 to 100° C., was formed into pellets ⅛ of an inch diameter and of the same length which were finally heated at 600° C. for one and a half hours.

Per hour 9 litres of nitrogen, 10 litres of air, 2.5 litres of ammonia (all measured at room temperature and atmospheric pressure) and 1.58 grams acrolein vapours=0.68 litre were passed through 8 grams of the catalyst contained in a helical reactor made of "Pyrex" glass of ¼ inch internal bore which was heated in a thermostatically controlled salt bath at 300° C. One part of the reactor served as a preheater to the bath temperature. The contact time was 1.2 seconds.

The gaseous reaction mixture issuing from the reactor was treated as described in Example 3.

35% of the acrolein fed was converted to acrylonitrile, 2% to carbon dioxide and 5% was recovered unchanged.

Example 9

A catalyst was prepared by adding 14 grams of sodium hydroxide dissolved in 50 cc. of water to a solution of 48.5 grams of nickel nitrate in 500 cc. water. The precipitate was filtered off and washed with water. It was then added to a mixture of 20 cc. acetic acid and 150 cc. water and 40 grams of silica gel particles, which passed an 8-mesh sieve but were retained on a 16-mesh sieve, was immersed in the resulting solution. The whole was evaporated to dryness and finally heated in air at about 500° C. The product was sieved free of fines.

Under the conditions described in Example 8, the acrolein was converted to acrylonitrile with a yield of 26%.

Example 10

A catalyst was prepared by reacting 16 grams of sodium metasilicate dissolved in water with dilute hydrochloric acid and the precipitated gel washed substantially free of salt. The washed gel was freed from water by suction and 30.3 grams of ammonium vanadate was then added to it. The mixture was stirred and evaporated to dryness and then heated to about 700° C. The resulting mass was broken up and sieved and particles of 8–16 mesh size were used in the test.

Under the conditions described in Example 8, acrolein was converted to acrylonitrile with a yield of 25%.

Example 11

A catalyst was prepared by adding 20 grams of silica gel particles which passed an 8-mesh sieve but were retained on a 16-mesh sieve to a solution of 27.5 grams of lead nitrate in 25 cc. of water. The mixture was evaporated to dryness and then heated to about 700° C.

Under the same conditions as given in Example 8 acrolein was converted to acrylonitrile in a yield of 10%.

Example 12

Per hour a mixture of 0.183 mole of methacrolein, 0.264 mole of oxygen and 0.99 mole of nitrogen, and a mixture of 8.4 mole of water and 0.47 mole of ammonia were separately preheated to the bath temperature and then fed over a catalyst containing 20% molybdenum oxide on silica gel in U tube as described in Example 7. The temperature in the reactor was kept between 430° and 448°, and the contact time of the gas mixture in the reactor was 2.9 seconds. The gases leaving the reactor were passed through a short scrubbing column in which slightly acidified water was circulated so as to remove the excess of ammonia from the gases and thence into a water scrubbing column. On distillation the scrubbing water provided a distillate which separated into two layers, the top layer being fractionated after the removal of water. A fraction boiling between 89° and 90° at 754 mms. constituted pure methacrylonitrile, which was obtained in a yield of 22%.

Example 13

25 litres per hour of a mixture of air, ammonia, and methacrolein vapour containing by volume 4.0% ammonia and 3.8% methacrolein vapour were passed through a U tube as described in Example 7, wherein the gas mixture was preheated to the bath temperature, containing 8 grams of a catalyst consisting of molybdenum oxide and phosphoric acid deposited on silica gel, prepared as described in Example 4. The contact time was 1.2 seconds. The reactor was heated by a liquid bath maintained at 400° C. The methacrylonitrile produced and unreacted methacrolein were recovered as described in Example 12. The pure nitrile was obtained after re-distillation in a yield of 30%.

Example 14

A mixture containing 102 litres of air, 17.5 litres of nitrogen and 11.1 grams (4.62 litres) vapourized allyl alcohol was preheated to 445° C. and mixed with 5.95 litres of ammonia and conducted per hour over 153 grams of a catalyst which was prepared as described in Example 2 maintained at a temperature of 445° C. in multi-tubular reactor of stainless steel. The contact time was 3.7 seconds. The gas mixture leaving the reactor was quenched in current of dilute sulphuric acid in an amount which was slightly more than sufficient to neutralise the unreacted ammonia. 39.1% of the allyl alcohol fed was converted to acrylonitrile, 4.3% to acrolein, 33.9% to carbon dioxide and 3.6% to carbon monoxide. No allyl alcohol was recovered unchanged.

Example 15

A molybdenum catalyst was prepared as described in Example 5. About 130 cc. of this catalyst was placed in a 25 mm. bore mild steel tube jacketed with a thermostatically controlled bath of liquid salt.

Per hour a mixture of 96 litres of air and 4.52 grams (1.87 litres) vaporized allyl alcohol, measured at atmospheric pressure and temperature, was preheated to 402° C. and mixed with 5.0 litres of ammonia and then conducted over the catalyst. The catalyst bed temperature was measured by a central thermo-couple tube and maintained between 407–426° C. The contact time was 4.7 seconds. The gas mixture leaving the reactor was treated as described in Example 14.

80.7% of the allyl alcohol fed was converted to acrylonitrile, 1.6% to acrolein and 0.8% was recovered unchanged.

*Example 16*

Per hour a mixture of 174.0 litres of air, 16.7 litres of nitrogen and 14.06 grams (3.85 litres at atmospheric conditions) beta-methoxy propionaldehyde was preheated at 390° C. and mixed with 4.5 litres of ammonia and passed over 150 ccs. of the molybdenum catalyst prepared as described in Example 5 in the 2.5 cm. bore reactor; the catalyst bed temperature ranged from 426–390° C. The contact time was 2.7 seconds.

The reaction product was worked up as in the preceding examples. 14.8% of the beta-methoxy propionaldehyde fed was converted to acrylonitrile.

*Example 17*

Pumice granules passing an 8-mesh and retained on a 16-mesh sieve (British Standard Testing Sieves) were immersed in a solution of 27 parts ammoninum molybdate in 195 parts of water and 5 parts of concentrated ammonia solution. The granules were then drained and dried. Experiments were carried out with four different quantities of the catalyst prepared in this manner contained in a "Pyrex" glass reactor heated by a liquid bath at 400° C., the temperature of the reactants being the same as the bath temperature. In each experiment 25 litres per hour of a mixture of 2 parts by volume of acrolein vapour, 2-3 parts by volume of ammonia, 18 parts by volume of oxygen and 77.7 parts by volume of nitrogen was led into the reactor. The following results were obtained:

| Width of reactor | Grams of catalyst used | Percent of acrolein fed converted to acrylonitrile | Contact time, secs. |
|---|---|---|---|
| ¼ inch | 3.8 | 23 | 1 |
| ¼ inch | 8.1 | 32 | 2.1 |
| ¼ inch | 27 | 45 | 7.1 |
| ½ inch | 54 | 55 | 14.4 |

*Example 18*

In a further experiment 16 grams of the catalyst described in Example 4 were placed next to 27 grams of the pumice supported catalyst in Example 17 in the same reactor, the smaller quantity of catalyst being at the exit end. The total contact time was 9.6 seconds. Under the conditions given in Example 17 the yield of acrylonitrile was 82% based on the acrolein fed.

*Example 19*

Ammonium molybdate was pelleted with about 3% of graphite to a size of 3/16 inch and activated by heating at 400–450° C. in an air stream for 11 hours.

250 ccs. of this catalyst were placed in a heated 2-inch bore mild steel reactor tube.

Per hour a mixture of 216 litres of gas mixture consisting of 1.9% by volume of acrolein, 2.4% ammonia, 18.2% oxygen and 77.5% nitrogen, were passed through the reactor tube at a contact time of 4.1 seconds. After 5½ hours, the bath temperature was 355° C., corresponding to a catalyst bed temperature of 375° C. At this point the percentage of acrolein converted was 98.5% with a yield of 69.8% of acrylonitrile at an efficiency of 70.9%. After 9 hours, the bath temperature was increased to 482° C. and the catalyst bed temperature to 550° C. The conversion of acrolein under these conditions was 96.4%, and the yield of acrylonitrile 21.1% at an efficiency of 22.0%.

*Example 20*

45 grams of activated alumina (8–18 mesh, British Standard Sieves) containing about 0.1% of combined sodium was mixed with a solution of 1 g. NaOH in 30 ml. water and the mixture was dried at 80° C. It was then heated at 1,000° C. for 22 hours. The alumina then contained about 1.4% by weight of combined sodium.

32 grams of this product was mixed with a solution of 12 grams ammonium molybdate in 20 ml. water, 5 ml. ammonia (0.88 specific gravity) and 5.5 ml. M phosphoric acid. The preparation was dried at 80° C.

When this catalyst was placed in the reactor at 380° C. the ammonium molybdate was decomposed and ammonia was evolved. The catalyst was tested by flowing acrolein thereover to give yields as indicated below.

Catalysts prepared as above but containing different amounts of combined sodium were also similarly prepared, and all catalysts were tested for acrylonitrile production as follows: 14 ml. of the catalyst was placed in a ¼ inch (internal diameter) glass reactor heated by a liquid bath at 380° C. 25 litres/hour (measured at room temperature and pressure) of a gas mixture consisting of:

2% by volume of acrolein
2.4% by volume of ammonia
95.6% by volume of air was passed over the catalyst while the temperature of the catalyst was maintained at about 380° C.

The gas leaving the reactor was quenched in dilute sulphuric acid and then scrubbed by a counter-current stream of water. Acrylonitrile was obtained by fractional distillation of the aqueous solution.

Two by-products of the reaction, carbon dioxide and hydrocyanic acid, were estimated by conventional methods.

The results obtained were as follows:

| Percent combined sodium by weight based on weight of alumina | Percent Conversion of acrolein fed to— | | |
|---|---|---|---|
| | Acrylonitrile | Hydrogen Cyanide | Carbon Dioxide |
| 0.1 | 59 | 9 | 13 |
| 0.4 | 69 | 7 | 6 |
| 0.7 | 73 | 8 | 5 |
| 1.4 | 77 | 7 | 4 |
| 3.0 | 73 | 8 | 6 |
| 11.6 | 33 | 0.3 | 17 |

By way of comparison an activated alumina substantially free of sodium was prepared by precipitating the hydroxide from solutions of aluminium nitrate and ammonia. A catalyst was made from this by the procedure outlined above except that no alkali was added. Conversion of acrolein fed to acrylonitrile, hydrogen cyanide and carbon dioxide were 40, 13 and 19 respectively.

*Example 21*

The process of Example 20 was repeated except that the sodium hydroxide was replaced by 3.26 g. of anhydrous sodium sulphate, giving a catalyst containing 2.35% of combined sodium based on the weight of alumina. In the subsequent reaction the percent conversion of acrolein fed was 75% to acrylonitrile, 6% to hydrogen cyanide, and 5% to carbon dioxide.

*Example 22*

The process of Example 20 was repeated using potassium hydroxide instead of sodium hydroxide. The results were as follows:

| Percent combined potassium by weight based on weight of alumina | Percent Conversion of acrolein fed to— | | |
|---|---|---|---|
| | Acrylonitrile | Hydrogen Cyanide | Carbon Dioxide |
| 1.95 | 68 | 7 | 7 |
| 7.0 | 78 | 6 | 5 |

*Example 23*

Activated alumina (8–18 mesh, British Standard Sieves) containing about 0.1% of combined sodium, which had been heated to 1050° C. for 22 hours, was impregnated with a solution of ammonium molybdate and sodium hydroxide. The catalyst was dried and heated in a stream of air at 380° C. to decompose the ammonium molybdate. It then contained 23% by weight of $MoO_3$ and about 1.2% of combined sodium.

Using the reaction conditions described in Example 20, this catalyst gave a conversion to acrylonitrile, based on acrolein fed, of 80%.

*Example 24*

Catalysts were prepared from two commercial grades of alumina, which contained less than 0.1 and 0.6% of combined sodium respectively. The method of preparation was as in Example 20 except that no alkali was added. The results, following the process of Example 20, were as follows:

| Percent combined sodium | Percent Conversion of acrolein fed to— | | |
|---|---|---|---|
| | Acrylonitrile | Hydrogen Cyanide | Carbon Dioxide |
| 0.1 | 53 | 9 | 13 |
| 0.6 | 73 | 6 | 5 |

What we claim is:

1. A process which comprises, reacting in the vapor phase an alpha,beta unsaturated aldehyde, ammonia and molecular oxygen in the presence of a catalyst selected from the group consisting of the metals and inorganic compounds of the metals, copper, chromium, vanadium, manganese, iron, cobalt, nickel, molybdenum, silver, zinc, cadmium, tin, tungsten, rhenium, lead, platinum, gold, aluminum, palladium, rhodium, bismuth, and uranium, at a temperature of 250–600° C. for a period not exceeding 20 seconds to form the corresponding nitrile from said aldehyde.

2. A process in accordance with claim 1 wherein the reaction is effected at a temperature of about 340 to about 450° C., for a period not over 20 seconds.

3. A process in accordance with claim 1 in which the unsaturated aldehyde is generated in the temperature range mentioned by the oxidation of the corresponding unsaturated alcohol.

4. A process in accordance with claim 1 in which the unsaturated aldehyde is generated in the reaction zone in the temperature range mentioned by the de-alcoholization of the corresponding saturated beta-alkoxy aldehyde.

5. A process in accordance with claim 1 in which a catalyst bed is employed and in which the reactants are fed in a gaseous stream over said bed and in which there is a positive temperature gradient of said bed in the direction of flow of the gas current.

6. A process in accordance with claim 1 wherein the catalyst is distributed on a carrier.

7. A process in accordance with claim 6 in which the carrier is pre-treated by heating.

8. A process in accordance with claim 6 in which the carrier is a siliceous material.

9. A process according to claim 1 in which the catalyst is a molybdenum compound.

10. A process in accordance with claim 1 in which the catalyst has been treated with phosphoric acid.

11. A process in accordance with claim 1 in which a gaseous mixture of the reactants is used which contains between 3 and 20% of oxygen.

12. A process in accordance with claim 1 in which a gaseous mixture is used and wherein the concentration of aldehyde in the gaseous mixture is below about 3%.

13. A process in accordance with claim 1 in which the aldehyde is acrolein and the molar ratio of ammonia to aldehyde is between 1.1 and 1.5:1.

14. A process in accordance with claim 1 in which a gaseous mixture of an alpha-beta unsaturated aliphatic aldehyde, ammonia and molecular oxygen is passed into contact with a catalyst in a reactor, part of the reacted gases leaving the reactor being recycled and the corresponding nitrile being recovered from the remainder of the reacted gases.

15. A process in accordance with claim 1 in which the reactants are pre-heated and then mixed prior to passage over a catalyst.

16. A process which comprises feeding a mixture of acrolein, ammonia and air pre-heated to a temperature of about 250–450° C., and mixed with an inert diluent, into a chamber containing a catalyst containing molybdenum oxide, maintaining the mixture as it passes over the catalyst at about 250 to about 450° C. with a contact time of the gaseous mixture of the reactants with the catalyst of 0.1 to 20 seconds, quenching the effluent and rendering it non-alkaline and extracting the resulting liquor to obtain acrylonitrile.

17. A process which comprises feeding a mixture of acrolein, ammonia, air and an inert diluent preheated to about 400° C. into a chamber containing phosphomolybdic acid on silica gel, the proportion of acrolein to oxygen and to ammonia being approximately 1:8.75:1.2, the contact time being about 1.2 seconds and conducting the reacted gas into dilute acid to remove excess of ammonia and extracting the resulting liquor to obtain acrylonitrile.

18. A process in accordance with claim 1 wherein the catalyst contains molybdenum deposited on alumina which has been heated to a temperature of between about 800° and 1200° C. for at least about half-an-hour, and wherein the catalyst contains an alkali metal selected from the group consisting of combined sodium in amount from about 0.1% up to 10% by weight and combined potassium in amount from about 0.1% up to 20% by weight, the weights being based on the weight of the alumina.

19. A process in accordance with claim 1 wherein the catalyst contains molybdenum deposited on alumina which has been heated to a temperature of between about 800° and 1200° C. for at least about half-an-hour, and wherein the catalyst contains about 1% of combined sodium based on the weight of the alumina.

20. A process in accordance with claim 1 wherein the catalyst contains molybdenum deposited on alumina which has been heated to a temperature of between about 800° and 1200° C. for at least about half-an-hour, and wherein the catalyst contains about 7% of combined potassium based on the weight of the alumina.

21. A process in accordance with claim 20, wherein the alkali metal content of the catalyst is obtained by treatment with a compound of said alkali metals selected from the group consisting of the hydroxides, chlorides, sulphates, carbonates, aluminates, nitrates, phosphates and molybdates.

No references cited.